United States Patent [19]

Paris et al.

[11] Patent Number: 4,757,960
[45] Date of Patent: Jul. 19, 1988

[54] LOST-FLUID HYDRAULIC ACTUATION SYSTEM

[75] Inventors: Francois Paris, Tarnos; Claude Johnson, Saint Michel/Orge; Albert Lecrivain, Bietigny S/Orge, all of France

[73] Assignee: Centre National d'Etudes Spatiales, Paris, France

[21] Appl. No.: 844,966

[22] Filed: Mar. 27, 1986

[30] Foreign Application Priority Data

Apr. 4, 1985 [FR] France ................. 85 05144

[51] Int. Cl.[4] ............................................. F41F 3/055
[52] U.S. Cl. ................. 244/3.22; 89/1.811; 60/415
[58] Field of Search ................. 89/1.8, 1.811; 244/3.22, 78, 227; 137/831, 832; 60/415, 416

[56] References Cited

U.S. PATENT DOCUMENTS

| | | | |
|---|---|---|---|
| 2,170,890 | 8/1939 | Allen | 60/415 |
| 2,278,181 | 3/1942 | Lieberherr | 60/416 |
| 2,290,479 | 7/1942 | Mercier | 60/416 |
| 2,866,385 | 12/1958 | Miller | 89/1.8 |
| 3,049,877 | 8/1962 | Sherman | 60/332 |
| 3,163,985 | 1/1965 | Bouyoucos | 60/416 |
| 3,443,475 | 5/1969 | Berton | 89/1.8 |
| 3,692,258 | 9/1972 | Parilla | 244/3.21 |
| 3,908,933 | 9/1975 | Goss et al. | 244/3.21 |
| 3,911,678 | 10/1975 | Shafer et al. | 60/416 |

FOREIGN PATENT DOCUMENTS 1237219  6/1960  France .
2068765  3/1971  France .

*Primary Examiner*—Stephen C. Bentley
*Assistant Examiner*—Stephen M. Johnson
*Attorney, Agent, or Firm*—Oblon, Fisher, Spivak, McClelland & Maier

[57] ABSTRACT

Lost-fluid hydraulic actuation system.

This system makes it possible to control for a short time an element (168) in an autonomous working unit, particularly a rocket, with an onboard means (100) connected to the unit. Hydraulic fluid under pressure is introduced into the element (168) by a delivery pipe (141). A tank (130) supplies the hydraulic fluid used during the autonomous working, a helium bottle (110) puts the hydraulic fluid under pressure, and an evacuation pipe (171) evacuates the hydraulic fluid out of the autonomous unit after it has actuated the element (168).

8 Claims, 4 Drawing Sheets

LOST-FLUID HYDRAULIC ACTUATION SYSTEM

FIELD OF THE INVENTION

This invention relates to a hydraulic system for actuation of an element in a rocket whose working is autonomous, at least for a limited time.

BACKGROUND OF THE INVENTION

In such autonomous units, there are elements or accessories which must be actuated by onboard means in the unit itself, to be used for example in flight. Thus, for a rocket, jacks direct the jet motor or motors to guide the unit.

The energy necessary for the jacks is usually furnished by a high pressure hydraulic pump which is driven by a gas or electric motor, the whole forming on onboard group in the rocket.

Before autonomous working, numerous tests must be made. In the prior art, the energy necessary to control the various elements to be tested is delivered by offboard energy sources, gas under pressure, or electric current. These energy sources were used to drive the onboard group while avoiding using the onboard energy sources, both not to increase the onboard weight and because these onboard sources may not yet be available.

The drawback of this technique is that the onboard pumping group is expensive, heavy, and of poor reliability.

SUMMARY OF THE INVENTION

This invention solves the problem of making a system of high reliability, low weight, and reduced maintenance. These objectives are attained thanks to a new organization of the hydraulic control system. It is essentially characterized by the fact that the hydraulic fluid is evacuated out of the unit after having fulfilled its actuation function. The hydraulic fluid leaves the actuated element at low pressure during the autonomous working.

In short, this is a lost-fluid process.

To put it into practice, the system essentially comprises, onboard in the unit: a tank of hydraulic fluid, a means for putting this fluid under pressure, a pipe for introducing the fluid under pressure into the element, and a pipe evacuating out of the unit the low-pressure fluid coming from the actuated element.

In most cases of application, the previous tests are made, according to a variant of the invention, by means of an offboard installation, with a separable joint, or interface.

The installation comprises at least one source of offboard hydraulic fluid, the onboard part of the corresponding interface being connected to the pipe for introducing the fluid into the element.

The pressurizing of the hydraulic fluid can be done by an onboard pump between the tank and the element, by an offboard hydraulic source under pressure, or by pressurizing the tank by means of a compressed gas introduced into it.

BRIEF DESCRIPTION OF THE DRAWINGS

The characteristics and advantages of the invention will become apparent from the following description of several embodiments of the invention applied to rockets and corresponding to the accompanying drawings.

DETAILED DESCRIPTION OF THE PRESENTLY PREFERRED EMBODIMENTS

Figure 1:
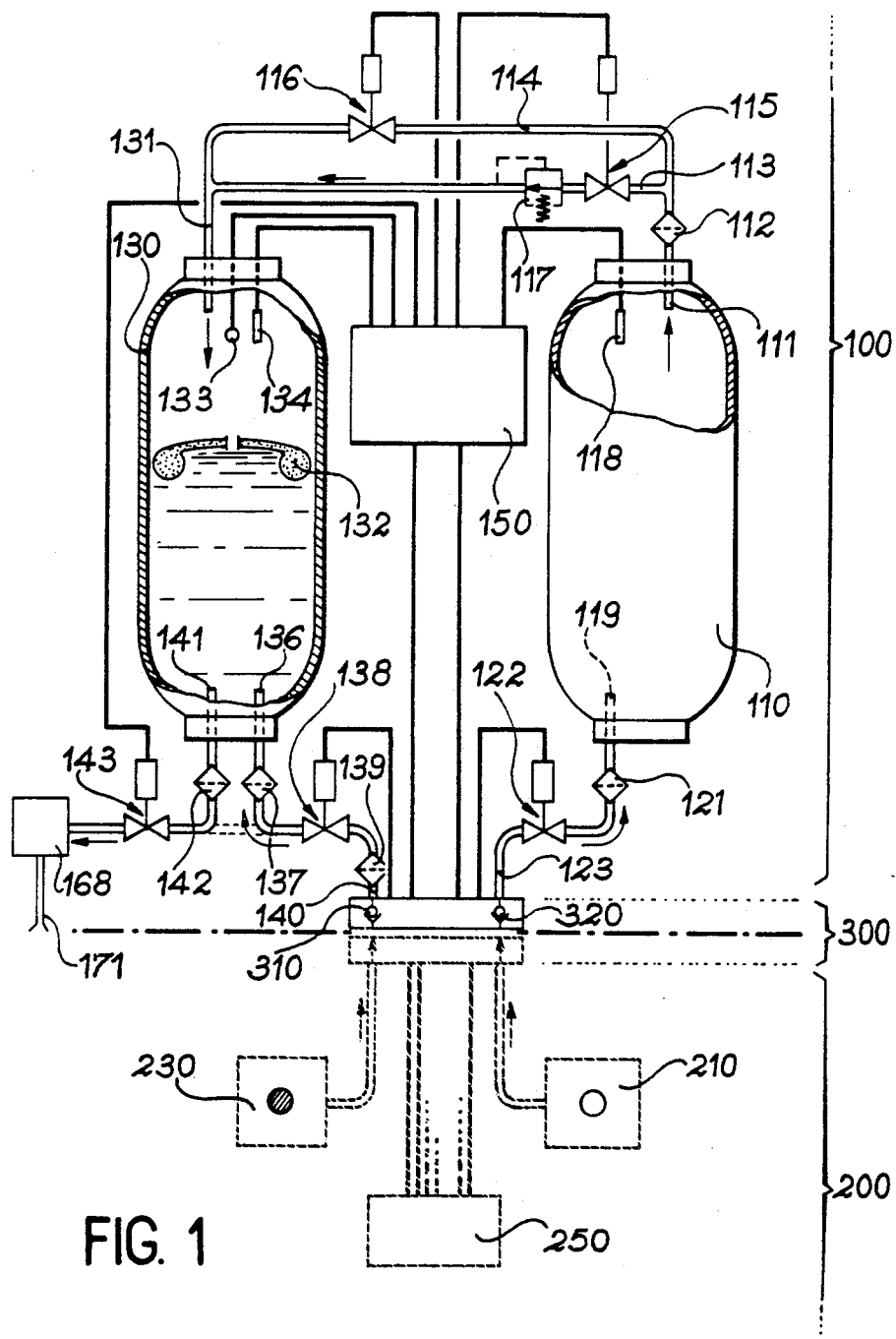
FIG. 1 represents a first embodiment of the invention using a tank of helium under pressure and a fluid exchanger.

The system represented in FIG. 1 comprises means 100 placed onboard the rocket, means 200 located on the ground, and an onboard-ground interface 300. Onboard means 100 comprise a helium bottle 110 under pressure (on the right part of the figure), a fluid tank 130 (on the left part) and control electronics 150 (in the center). The pressure of the helium bottle 110 is, for example, 60 MPa and that of the fluid tank 130 30 MPa. The helium contained in the bottle 110 is directed into the fluid tank 130 by a pipe 111 equipped with a filter 112. Then there are two parallel pipes 113 and 114 each equipped with a solenoid valve 115 and 116 for pressure regulation. The pipe 113 is further associated with a pressure regulator 117. The helium bottle 110 is also equipped with a pressure sensor 118.

The fluid tank 130, at its upper part, receives the helium under pressure through an intake pipe 131. A diaphragm-float 132 in the fluid tank 130 separates the helium from the hydraulic fluid to prevent dissolution of the helium in the hydraulic fluid. The fluid tank 130 is equipped with a liquid level sensor 133 and with a pressure sensor 134.

The unit consisting of the solenoid valves 115, 116 and the pressure sensors 118, 134 is connected to the control electronics 150, which performs various comparisons between the measured magnitudes and reference values and, consequently, delivers orders controlling the opening or closing of the solenoid valves 115, 116.

At the lower part of the onboard system 100, on the side of the helium bottle 110, there is a pipe 119 for introducing helium into the helium bottle 110. The pipe 119 is equipped with a filter 121 connected to an inflation solenoid valve 122 and to an intake pipe 123. On the side of the fluid tank 130 there is a pipe 136 for introducing fluid into the fluid tank 130. The pipe 136 is connected to a filter 137, a filling solenoid valve 138, a filter 139, and a hydraulic fluid intake pipe 140.

The fluid tank 130 further comprises, at its lower part, a delivery pipe 141 equipped with a filter 142 and with a starting solenoid valve 143. The starting solenoid valve 143 is connected to an element 168 to be controlled.

The onboard-ground interface 300 comprises a joint 310 for introducing hydraulic fluid (self-closing check valves or sleeves of known type), which make it possible to connect the hydraulic fluid intake pipe 140 to a hydraulic fluid source 230 located on the ground. In the example shown, the interface 300 further comprises a helium intake joint 320 connecting the intake pipe 123 to a helium source 210 under high pressure.

The interface 300 also comprises various standard electrical connections making it possible to connect the control electronics 150 and the inflation solenoid valve 122 and the filling solenoid valve 138 to a control circuit 250 located on the ground.

With this system, when it is desired to control an element of the rocket, while it is still on the ground, the hydraulic fluid (for example, oil) is introduced into the fluid tank 130 by opening the filling solenoid valve 138. The fluid under pressure is conveyed to the element to be controlled 168 by the starting solenoid valve 143, its pressure being able to come either from the hydraulic fluid source 230 or from the helium bottle 110. After use, the fluid is evacuated to the open air without pressure through an evacuation pipe 171 coming from the element 168.

In flight, the interface 300 is separated (on takeoff all connections are torn away and the links are broken). Controlling the element 168 is still performed by the same hydraulic fluid but, this time, thanks to the helium pressure introduced into the fluid tank 130. The control fluid is conveyed to the element 168 through the starting solenoid valve 143, which is the same valve that was used for the tests on the ground.

Incidentally, it will be observed that the hydraulic fluid introduced at the low part of fluid tank 130, during an order from the ground, is degassed by its passage through this tank. For this reason, this arrangement is preferred to the one which would consist in connecting the filling solenoid valve 138 directly to the starting solenoid valve 143 without passing through the fluid tank 130, an arrangement which is nonetheless possible (in broken lines in FIG. 1).

The system which has just been described is very reliable (both from the fact of the very reliable number of active elements and from the fact of the redundancies present in the system of helium transfer to the exchanger). Moreover, elements making possible the control of the elements on the ground add only very little weight to the onboard system since these are only the joint 310, the filling solenoid valve 138 and the pipe 136.

Figure 2:
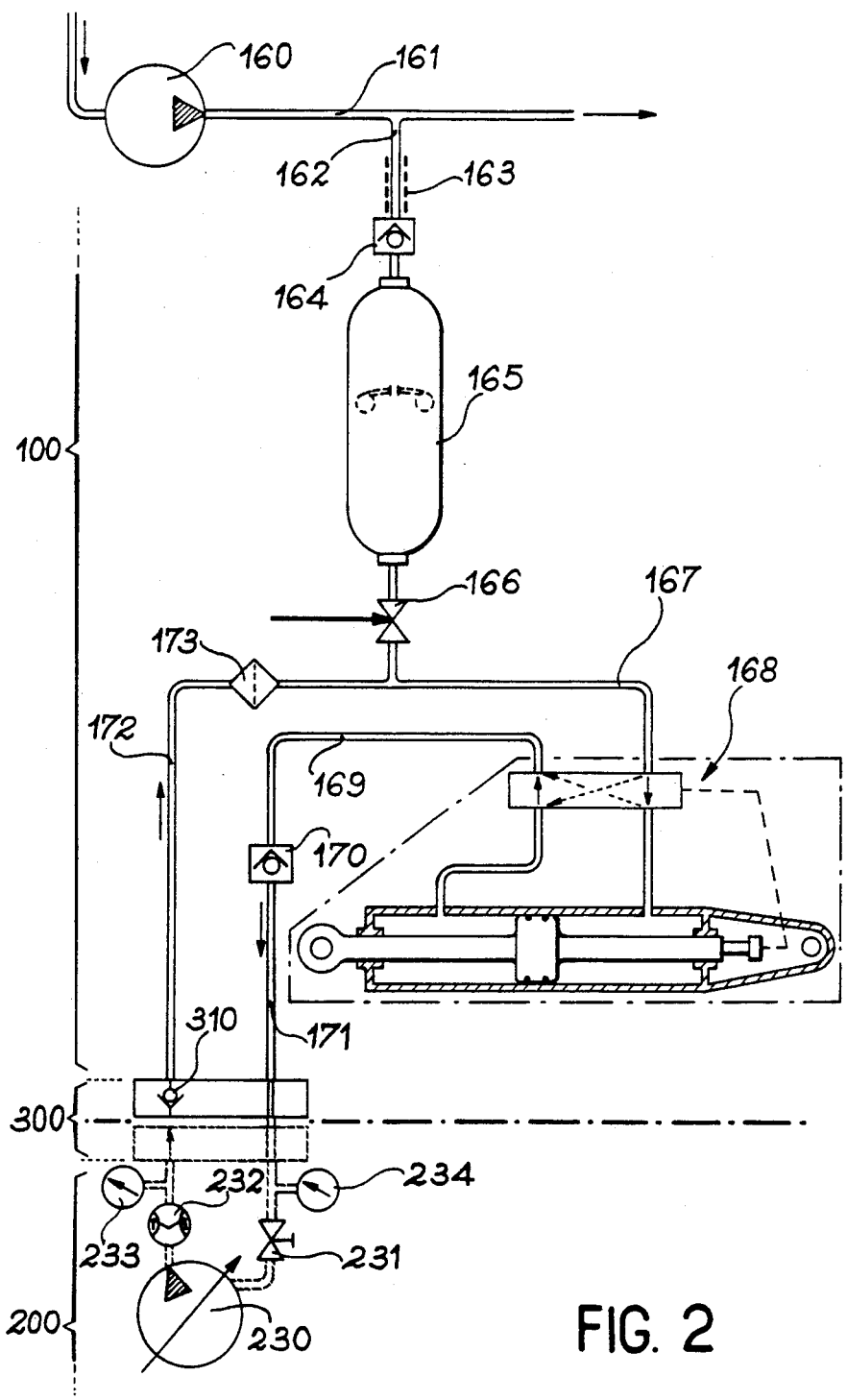
FIG. 2 illustrates a second embodiment of the invention corresponding to a liquid hydrogen rocket.

FIG. 2 illustrates a simpler embodiment in which the motors of the rocket are supposed to be fed by liquid hydrogen. Further, as before, there are onboard means 100, ground means 200 and an onboard-ground interface 300. The rocket comprises, onboard, a pump 160 connected, on the one hand, to a tank of liquid hydrogen not shown and, on the other hand, to a hydrogen delivery pipe 161, which is connected to a motor of the rocket (not shown). The system has a bypass pipe 162 which is tapped on the hydrogen delivery pipe 161 and is equipped with a means 163 for heating the bypassed fluid and for vaporizing it. The bypass pipe 162 has a check valve 164 and comes out in a fluid tank 165 (similar to the fluid tank 130 shown in FIG. 1). At the output of the fluid tank 165 is a pneumatically or electrically controlled starting valve 166. The starting valve 166 is connected, by a pipe 167, to the element 168 to be controlled which, in the example shown, consists of a servovalve connected to a jack. The servovalve is connected to an evacuation pipe 169 equipped with a check valve 170 and with the evacuation pipe 171 out of the rocket.

The system further comprises, in the onboard-ground interface 300, the joint 310 connected to the source 230 of hydraulic fluid under pressure located on the ground. The joint 310 communicates with a pipe 172 equipped with a filter 173 connected to the pipe 167 downstream from the starting valve 166.

For the tests on the ground, the hydraulic fluid is introduced through the joint 310 up to the element 168 through pipes 172 and 167, the starting valve 166 being closed. The fluid is identical with the fluid used in flight, delivered by the fluid tank 165.

The hydraulic fluid is evacuated after use through the evacuation pipe 171. On the ground, the effluent is sent back to the hydraulic fluid source 230, which is a standard hydraulic unit.

Figure 3:
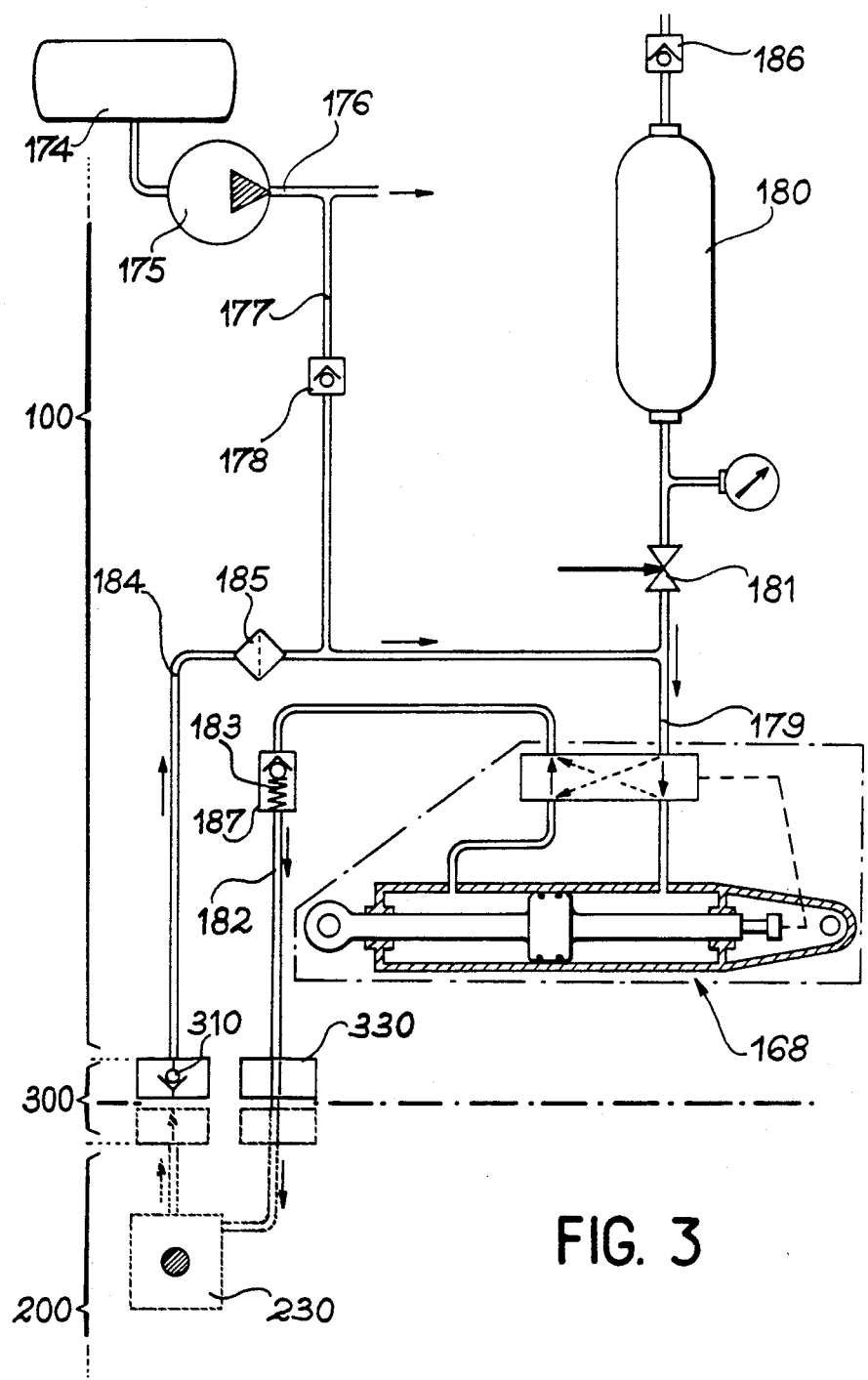
FIG. 3 illustrates a third embodiment of the invention in which the hydraulic control fluid is water.

FIG. 3 corresponds to a rocket equipped with a water pump 175 fed by a tank 174. The water pump 175 delivers water under high pressure into a pipe 176, for example to cool combustion gases which actuate a turbine that drives the water pump 175, among others. According to the invention, bypass pipe 177 is connected to the pipe 176. The bypass pipe 177 is equipped with a check valve 178 and is connected to a pipe 179 for introducing the driving fluid under pressure into the element 168, which is also of the servovalve and jack type. Optionally, the onboard means can further comprise a small water accumulator 180, under gas pressure introduced through a check valve 186, which can temporarily actuate the element before starting of the pump, and which, being placed in a high position, can serve as a degasser. Starting of the water pump 175 can be accompanied by a certain entrainment of bubbles.

After use in the element 168, the water at low pressure is evacuated to the atmosphere by a pipe 182, through a check valve 187 supported by a small spring 183 to prevent an emptying of the element 168 by a free flow.

The means making possible the tests on the ground comprise the joint 310 connected to the source 230 of hydraulic fluid under pressure feeding the element 168 by a pipe 184, a filter 185, and the pipe 179.

On the ground, the fluid evacuated by the pipe 182 is brought back to the hydraulic fluid source 230 by separable interface 330.

Figure 4:
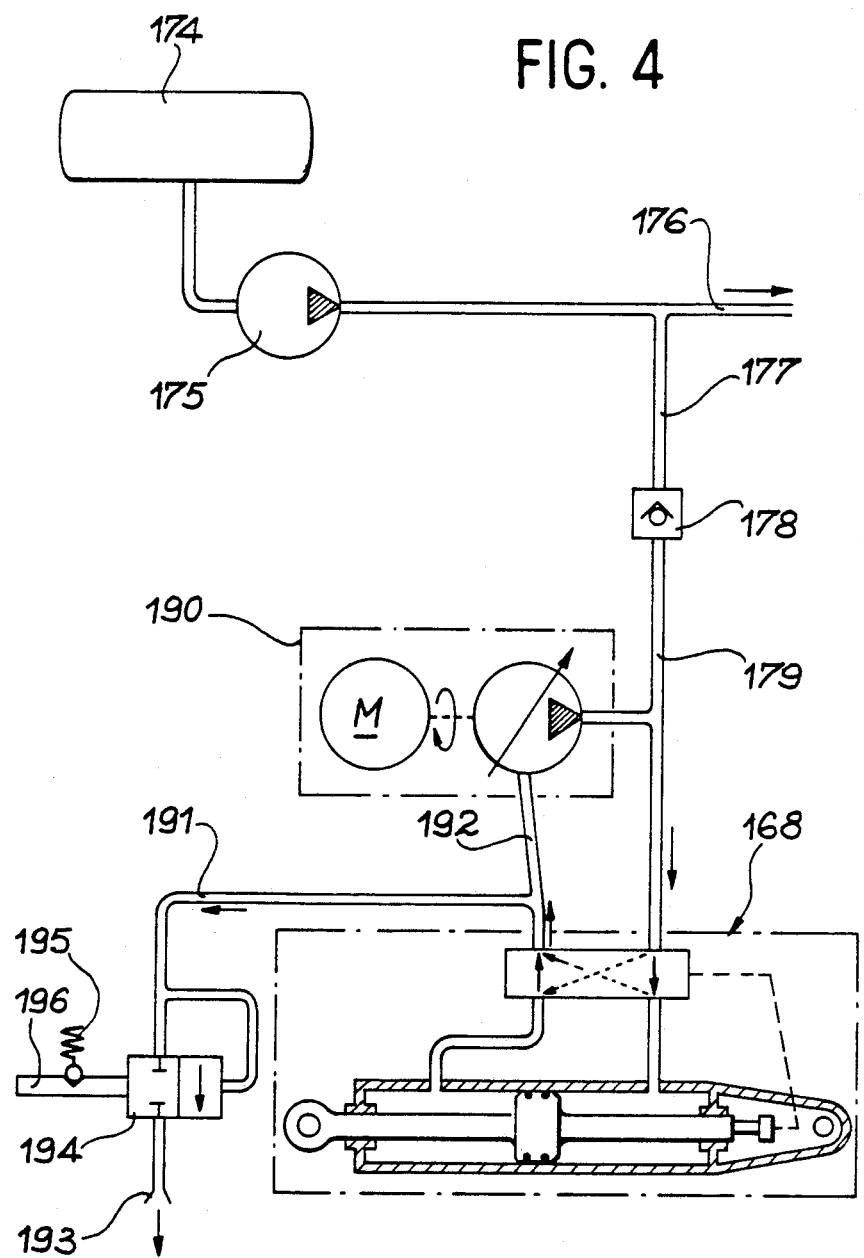
FIG. 4 is a fourth embodiment of the invention added to an onboard motor-driven pump of the usual type.

FIG. 4 relates to a rocket of the same type as that of FIG. 3, but already equipped with an onboard closed circuit pumping group 190, for example of the low-pressure fluidtight type, having a low-pressure return 192. Here the invention is applied in redundance to assure an operation of the element 168 in case of failure of the pumping group 190, which normally delivers a greater oil pressure than that of the water coming from the water pump 175.

The same bypass 177 as that of FIG. 3 communicates with the pipe 179 for high-pressure introduction into the element 168, and in addition a tapping 191, coming from the low-pressure return 192 of the pumping group 190, is separated from an evacuation pipe 193 by a plug 194 which is opened only in case of failure of the pumping group 190, which then makes possible the use of the water under pressure.

The opening can be obtained by the abnormal increase of the low pressure acting on the plug 194 itself, since in case of the stopping of the pumping group 190 the pressure of the water opens the check valve 178 and is quickly communicated to all the circuits through the servovalve. For this purpose, the plug 194 can be a valve with total opening by excess pressure forcing a holding unit with a spring 195 on a ramp 196, as diagrammed in FIG. 4. More simply, it can consist of a simple membrane whose breaking is determined by the desired pressure.

The presence of an offboard hydraulic fluid source 230, as in the examples of FIGS. 1, 2, and 3, makes it possible to place the maximum number of necessary control and measuring instruments there, lightening and simplifying the autonomous unit accordingly.

In the cases of FIGS. 2 and 3 in particular, this unit can carry no instrument, valve, or filter other than those shown—the filling valves, manometers, and flowmeters being part of the hydraulic fluid source 230.

Thus the putting into practice of the embodiment described with reference to FIG. 1 can comprise:

the making by the producer of an indissociable delivery, fluidtight and purged of air, consisting of the actuation system and of the element 168, the transport and mounting of the whole on the autonomous unit, the joining with the offboard means 200 by the interface 300, a return valve 231 in the hydraulic fluid source 230 being closed and the starting valve 166 open, the filling of hydraulic fluid by the offboard hydraulic fluid source 230, the control of the volume of the hydraulic fluid in the fluid tank 165 by offboard an adding counter 232, an additional control of this volume by an offboard manometer 233 which, by direct communication with the pipe 172, gives the pressure of the fluid tank 165. This pressure depends on this volume and on the pressure of the purge gas at the time of the joining of the interface 300, a gas pressure given by an offboard manometer 234 tapped on the return in the hydraulic fluid source 230 upstream from the return valve 231.

Moreover, the return valve 231 makes possible the emptying of hydraulic fluid in case of tests without autonomous working of the unit.

We claim:

1. An actuation system for a rocket, said actuation system comprising:
    (a) an element on board the rocket to be controlled hydraulically;
    (b) a first tank for a hydraulic fluid on board the rocket;
    (c) pressurizing means on board the rocket, said pressurizing means being connected to said first tank for pressurizing hydraulic fluid in said first tank;
    (d) a delivery pipe on board the rocket and connecting said first tank to said element for introducing hydraulic fluid under pressure into said element;
    (e) a starting valve in said delivery pipe on board the rocket;
    (f) an evacuation pipe on board the rocket and connected to said element for evacuating hydraulic fluid out of the rocket after the hydraulic fluid has actuated said element;
    (g) a separable interface comprising:
        (i) an onboard part comprising a first joint and
        (ii) an offboard part comprising means for connecting said first joint to an offboard source of hydraulic fluid;
    (h) an introduction pipe connecting said first joint to said first tank; and
    (i) a filling valve in said introduction pipe.

2. An actuation system according to claim 1, wherein said pressurizing means is a second tank which, in use, contains a gas under pressure which is introduced into said first tank by a gas pipe, said second tank and said gas pipe being on board the rocket.

3. An actuation system according to claim 2, wherein said second tank is an onboard bottle.

4. An actuation system according to claim 3, wherein said bottle is connected to a second joint in said onboard part of said separable interface by a tube.

5. An actuation system according to claim 2, wherein said first tank has a mobile separating wall which, in use, is located between the gas and the hydraulic fluid in said first tank.

6. An actuation system according to claim 4 and further comprising means for connecting said second joint to an offboard source of gas under pressure.

7. An actuation system according to claim 2, wherein said gas pipe contains a pressure regulator.

8. An actuation system according to claim 2, wherein said gas pipe contains a valve controlled by a control element.

* * * * *